US008152627B2

(12) United States Patent
Berman et al.

(10) Patent No.: US 8,152,627 B2
(45) Date of Patent: Apr. 10, 2012

(54) GAMING METHOD AND APPARATUS FOR FACILITATING A GAME INVOLVING SPECIALTY WILD FUNCTIONALITY

(75) Inventors: Bradley Berman, Minnetonka, MN (US); Ryan Strand, Hopkins, MN (US); Chad Shapiro, Plymouth, MN (US); Adam Martin, St. Louis Park, MN (US)

(73) Assignee: King Show Games, Inc., Minnetonka, MN (US)

( * ) Notice: Subject to any disclaimer, the term of this patent is extended or adjusted under 35 U.S.C. 154(b) by 483 days.

(21) Appl. No.: 12/354,493

(22) Filed: Jan. 15, 2009

(65) Prior Publication Data

US 2010/0178976 A1 Jul. 15, 2010

(51) Int. Cl.
*A63F 9/24* (2006.01)
*A63F 13/00* (2006.01)
*G06F 17/00* (2006.01)
*G06F 19/00* (2011.01)

(52) U.S. Cl. ................ 463/21; 463/16; 463/17; 463/20; 463/22

(58) Field of Classification Search .................... 463/20, 463/16, 17, 19, 21, 22
See application file for complete search history.

(56) References Cited

U.S. PATENT DOCUMENTS 6,089,977 A 7/2000 Bennett
6,251,013 B1 6/2001 Bennett
6,290,600 B1 9/2001 Glasson
6,311,976 B1 11/2001 Voseloff et al.
6,419,579 B1 7/2002 Bennett
6,439,993 B1 8/2002 O'Halloran
6,517,432 B1 2/2003 Jaffe
6,551,187 B1 4/2003 Jaffe
6,554,704 B2 4/2003 Nicastro, II
6,561,900 B1 5/2003 Baerlocher et al.
6,565,433 B1 5/2003 Baerlocher et al.
6,572,472 B1 6/2003 Glavich (Continued)

FOREIGN PATENT DOCUMENTS

WO WO 97/32285 9/1997

*Primary Examiner* — Jarrett Stark

(74) *Attorney, Agent, or Firm* — Hollingsworth & Funk, LLC

(57) ABSTRACT

Various embodiments are directed to a plurality of rounds of a game, the game comprising providing a play area comprising a plurality of regions and game elements distributed within the regions, moving a roving wild indicator within the play area to one of the game elements, the roving wild indicator moving between the game elements within the play area during each of the plurality of rounds of the game, the element to which the roving wild indicator moves exhibiting wild functionality for at least a current round of the game, selecting one of the plurality of regions as a wild region, each element within the wild region exhibiting wild functionality for at least the current round of the game, marking a plurality of the game elements, each marking for each element of the plurality selected from a plurality of different marking types, evaluating elements of the play area to identify if the game element to which the roving wild indicator is moved in the current round of the game is within the wild region, evaluating elements of the play area to identify if one or more series of corresponding marked elements were formed, wherein the elements marked with common types of the different marking types correspond to one another and elements exhibiting wild functionality correspond to all game elements, and initiating at least one game play function other than wild functionality if the game element to which the roving wild indicator is moved is within the wild region based on the evaluation of the elements.

19 Claims, 8 Drawing Sheets

U.S. PATENT DOCUMENTS

| | | | | |
|---|---|---|---|---|
| 6,602,136 | B1 | 8/2003 | Baerlocher et al. | |
| 6,638,165 | B2 | 10/2003 | Uchiyama et al. | |
| 6,672,960 | B1 | 1/2004 | Jensen | |
| 6,676,512 | B2 | 1/2004 | Fong et al. | |
| 6,780,109 | B2 | 8/2004 | Kaminow | |
| 6,805,349 | B2 | 10/2004 | Baerlocher et al. | |
| 6,866,583 | B2 | 3/2005 | Glavich et al. | |
| 6,918,832 | B2 | 7/2005 | Baerlocher et al. | |
| 7,040,985 | B2 | 5/2006 | Vancura | |
| 7,090,580 | B2 * | 8/2006 | Rodgers et al. | 463/20 |
| 2002/0175466 | A1 * | 11/2002 | Loose et al. | 273/143 R |
| 2003/0190948 | A1 | 10/2003 | Baerlocher et al. | |
| 2003/0220134 | A1 | 11/2003 | Walker et al. | |
| 2004/0048646 | A1 | 3/2004 | Visocnik | |
| 2004/0082378 | A1 | 4/2004 | Peterson et al. | |
| 2005/0054429 | A1 | 3/2005 | Baerlocher et al. | |
| 2005/0130731 | A1 | 6/2005 | Englman | |
| 2005/0130737 | A1 | 6/2005 | Englman | |
| 2006/0058095 | A1 | 3/2006 | Berman et al. | |
| 2006/0058097 | A1 | 3/2006 | Berman et al. | |
| 2006/0073880 | A1 | 4/2006 | Thomas | |
| 2008/0005764 | A1 * | 1/2008 | Arling et al. | 725/39 |
| 2008/0032770 | A1 | 2/2008 | Okada | |
| 2008/0032773 | A1 | 2/2008 | Okada | |
| 2008/0108411 | A1 | 5/2008 | Jensen | |
| 2009/0111566 | A1 * | 4/2009 | Naicker et al. | 463/20 |
| 2009/0131145 | A1 * | 5/2009 | Aoki et al. | 463/20 |
| 2009/0209321 | A1 * | 8/2009 | Alderucci et al. | 463/22 |
| 2010/0016054 | A1 * | 1/2010 | Berman et al. | 463/18 |
| 2010/0178976 | A1 * | 7/2010 | Berman et al. | 463/20 |

* cited by examiner

GAMING METHOD AND APPARATUS FOR FACILITATING A GAME INVOLVING SPECIALTY WILD FUNCTIONALITY

FIELD OF THE INVENTION

This invention relates in general to gaming systems and processes, and more particularly to gaming systems, methods and apparatuses for facilitating a game involving a specialty wild functionality.

BACKGROUND OF THE INVENTION

Gaming devices such as slot machines have entertained the public for over a century. While the fundamental concept behind slot games has remained relatively intact, the manners of computing, displaying, and participating in modern day slot games have changed dramatically. One force driving these changes is technological advancement, such as the advent of computers and video capabilities. Another driving force is human nature, as the participants of such gaming devices demand continual excitement and stimulation. It is therefore important in the gaming industry that gaming innovations continue to be rolled out to the participating public.

Conventional slot games and the like involve relatively linear game play that can become repetitive and monotonous for a player. For example, a conventional slot machine involves repeatedly spinning three reels in an attempt to line reel symbols up in a configuration that triggers a payout. While the outcome of each game is not predictable, the manner of game play is identical each time the game is played. Such games can have limited ability in sustaining a player's interest as the game play becomes monotonous over time.

SUMMARY

To overcome limitations in the prior art described above, and to overcome other limitations that will become apparent upon reading and understanding the present specification, the present invention discloses systems, apparatuses and methods for providing, among other features, games with specialized wild functionality.

Various embodiments are directed to a method of facilitating a plurality of rounds of a game, the method including providing a play area comprising a plurality of regions and game elements distributed within the regions; moving a roving wild indicator within the play area to one of the game elements, the roving wild indicator moving between the game elements within the play area during each of the plurality of rounds of the game, the element to which the roving wild indicator moves exhibiting wild functionality for at least a current round of the game; selecting one of the plurality of regions as a wild region, each element within the wild region exhibiting wild functionality for at least the current round of the game; marking a plurality of the game elements, each marking for each element of the plurality selected from a plurality of different marking types; evaluating elements of the play area to identify if the game element to which the roving wild indicator is moved in the current round of the game is within the wild region; evaluating elements of the play area to identify if one or more series of corresponding marked elements were formed, wherein the elements marked with common types of the different marking types correspond to one another and elements exhibiting wild functionality correspond to all game elements; and initiating at least one game play function other than wild functionality if the game element to which the roving wild indicator is moved is within the wild region based on the evaluation of the elements.

Embodiments may include that each of the plurality of regions comprise a respective vertically orientated column of game elements spanning between a top and a bottom of the play area.

Embodiments may further include providing a plurality of column indicators located outside of the play area, each indicator of the plurality indicating a state of each region of the plurality, wherein selecting one of the plurality of regions as the wild region further comprises randomly selecting one of the column indicators and selecting the wild region based on which one of the plurality of column indicators is randomly selected.

Embodiments may further include that moving the roving wild indicator within the play area further comprises moving the roving wild indicator to a randomly selected game element adjacent to the game element at which the roving wild indicator was located in the previous round of game play.

Embodiments may further include that initiating at least one game play function comprises initiating a plurality of free plays, each free play comprising re-marking the plurality of the game elements and evaluating the play area to identify if one or more series of corresponding marked elements were formed by each re-marking.

Embodiments may further include relocating the roving wild indicator to a game element adjacent the game element to which the roving wild indicator was moved in the current round if the game element to which the roving wild indicator was moved in the current round of the game is within the wild region based on the evaluation, wherein the wild indicator is relocated before the evaluation of the elements of the play area to identify if one or more series of corresponding marked elements were formed.

Embodiments may further include issuing a payout for each of the identified one or more series of corresponding marked elements.

Embodiments may further include that moving the roving wild indicator within the play area to one of the game elements further comprises moving the roving wild indicator within the play area to a randomly selected one of the game elements; selecting the one of the plurality of regions as the wild region further comprises randomly selecting the one region from the plurality of regions; and marking the plurality of the game elements further comprises randomly selecting a respective marking for each of the plurality of game elements from the plurality of different marking types.

Various embodiments are directed to a computer-readable medium having instructions stored thereon which are executable by the processor for facilitating a game having a plurality of rounds by performing steps comprising: displaying a play area on a display device, the play area comprising a plurality of regions and game elements distributed within the regions; moving a roving wild indicator within the play area to one of the game elements, the roving wild indicator moving between the game elements within the play area during each of the plurality of rounds of the game, the element to which the roving wild indicator moves exhibiting wild functionality for at least a current round of the game; selecting one of the plurality of regions as a wild region, each element within the wild region exhibiting wild functionality for at least the current round of the game; marking a plurality of the game elements, each marking for each element of the plurality selected from a plurality of different marking types; evaluating elements of the play area to identify if the game element to which the roving wild indicator is moved in the current round of the game is within the wild region; evaluating elements of the play area to identify if one or more series of corresponding marked elements were formed, wherein the elements marked with common types of the different marking types correspond to one another and elements exhibiting wild functionality correspond to all game elements; and initiating at least one game play function other than wild functionality if the game element to which the roving wild indicator is moved is within the wild region based on the evaluation of the elements.

Various embodiments are directed to a gaming apparatus for facilitating a game having a plurality of rounds comprising: a display device; a processor configured to: facilitate display of a play area on the display device, the play area comprising a plurality of regions and game elements distributed within the regions; control movement of a roving wild indicator within the play area to one of the game elements, the roving wild indicator moving between the game elements within the play area during each of the plurality of rounds of the game, the element to which the roving wild indicator moves exhibiting wild functionality for at least a current round of the game; control selection of one of the plurality of regions as a wild region, each element within the wild region exhibiting wild functionality for at least the current round of the game; control marking of a plurality of the game elements, each marking for each element of the plurality selected from a plurality of different marking types; evaluate elements of the play area and determine if the game element to which the roving wild indicator is moved in the current round of the game is within the wild region; evaluate elements of the play area and determine if one or more series of corresponding marked elements were formed, wherein the elements marked with common types of the different marking types correspond to one another and elements exhibiting wild functionality correspond to all game elements; and control initiation of at least one game play function other than wild functionality if the game element to which the roving wild indicator is moved is within the wild region based on the evaluation of the elements.

Various embodiments are directed to a gaming apparatus for facilitating a game having a plurality of rounds comprising: means for presenting a play area comprising a plurality of regions and game elements distributed within the regions; means for moving a roving wild indicator within the play area to one of the game elements, the roving wild indicator moving between the game elements within the play area during each of the plurality of rounds of the game, the element to which the roving wild indicator moves exhibiting wild functionality for at least a current round of the game; means for selecting one of the plurality of regions as a wild region, each element within the wild region exhibiting wild functionality for at least the current round of the game; means for marking a plurality of the game elements, each marking for each element of the plurality selected from a plurality of different marking types; means for evaluating elements of the play area to identify if the game element to which the roving wild indicator is moved in the current round of the game is within the wild region; means for evaluating elements of the play area to identify if one or more series of corresponding marked elements were formed, wherein the elements marked with common types of the different marking types correspond to one another and elements exhibiting wild functionality correspond to all game elements; and means for initiating at least one bonus game play function if the game element to which the roving wild indicator is moved is within the wild region based on the evaluation of the elements.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

In the following description of the invention, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

In conventional slot machine gaming, a player watches for alignment of a series of symbols to trigger payouts, such as horizontal alignment of three cherry symbols. The symbols are typically presented on a plurality of spinning reels (actual reels or graphically depicted reels) and the relative positioning of the reels after spinning determines the symbol alignment and payouts associated with symbol series formation. This conventional game play can become monotonous for a player because the player is essentially looking for one thing as the reels slow down—the alignment of symbols. The present disclosure provides multiple interwoven layers of game play which entertain and excite players beyond conventional single layer game play.

In contrast to the lining up of multiple symbols in a conventional slot game, the game aspects of the present disclosure provides game outcomes favorable to the player beyond symbol alignment, while also preserving some spinning reel/symbol alignment aspects liked by players. As will be further described, embodiments of the present disclosure involve multilayered game play aspects that provided for less predictable manner of game play and therefore greater excitement for the player.

Figure 1A:
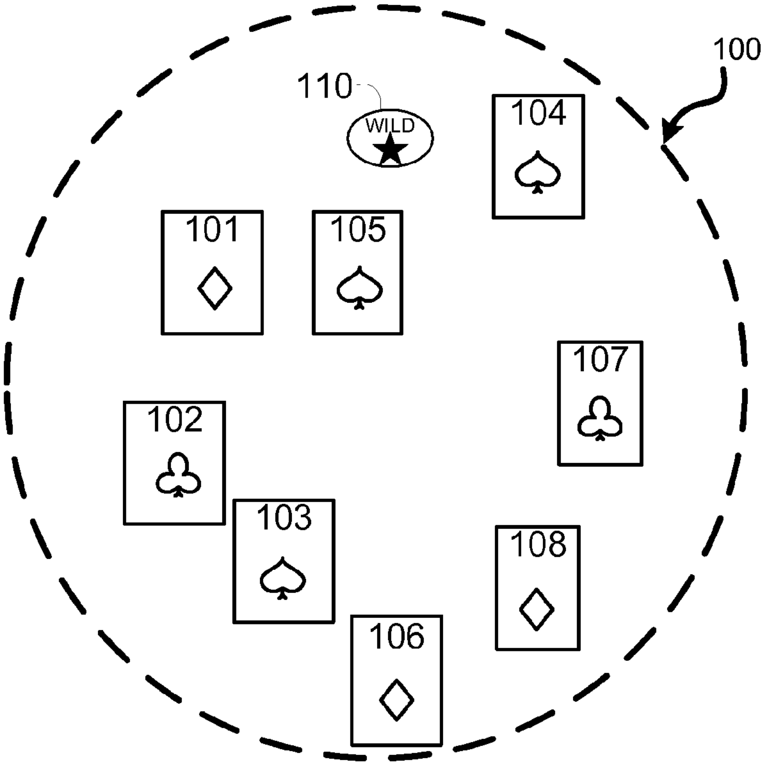
FIGS. 1A-B illustrates an embodiment of a gaming activity utilizing specialized wild functionality in accordance with aspects of the invention.

FIG. 1A illustrates a multilayered gaming embodiment. The gaming embodiment of FIG. 1 includes a play area 100 inside of which are a plurality of game elements 101-108. The game elements 101-108 are respectively marked with card-themed symbols. In particular, elements 101, 106, and 108 have been marked by respective diamond symbols.

Marking, as referred to herein, includes distinguishing at least one element from at least one other element. There are many ways in which one element can be distinguished from another element, and therefore there are many different ways to mark an element. For example, an element could be marked simply by it being created or located in an array or display area. Marking can also include placing and/or representing a symbol, one or more colors, flag, characters, images, graphics, numbers, letters, shapes, features, or designs on, or associated with, an element. In some embodiments, elements are not marked by any symbol, color, letter or numeral, and in those embodiments, the elements themselves can be markings. Distinguishing of elements can be done to physical elements, such as element pieces of a board or on a reel strip. Distinguishing of elements can also be done to elements represented on a display screen.

Marking can be done in various ways. For example, some elements can be randomly marked, such that there is a probability that a particular element will be marked or not marked. Determining whether a particular element will be marked can be done by various means, including random number generation, as discussed herein. If an element is selected to be marked, then another step can be taken to determine which of the possible different types of markings will be used to mark the particular element. However, in some embodiments only one type of marking is available. Moreover, in some embodiments, a process is conducted to randomly select a particular marking for an element, and amongst the different marking outcomes that can be selected is an outcome where the element is not marked.

In some embodiments, only a certain number of elements will be marked and some of the elements will be left unmarked. An evaluation can then be conducted to determine whether, for example, a series of adjacent marked elements was formed to calculate payouts. In some embodiments, all elements of a particular type or grid will be marked and a random number generator or other selection means will be used to determine the particular marking for each element of the type or grid.

A wild indicator 110 is also located within the play area 100. According to the gaming embodiment of FIGS. 1A-B, the wild indicator 110 moves within the play area 100 during the course of game play. In some embodiments, the wild indicator 110 moves only once each round of game play. In some embodiments, the wild indicator 100 may continuously move or move multiple times within each round of game play.

Figure 1B:
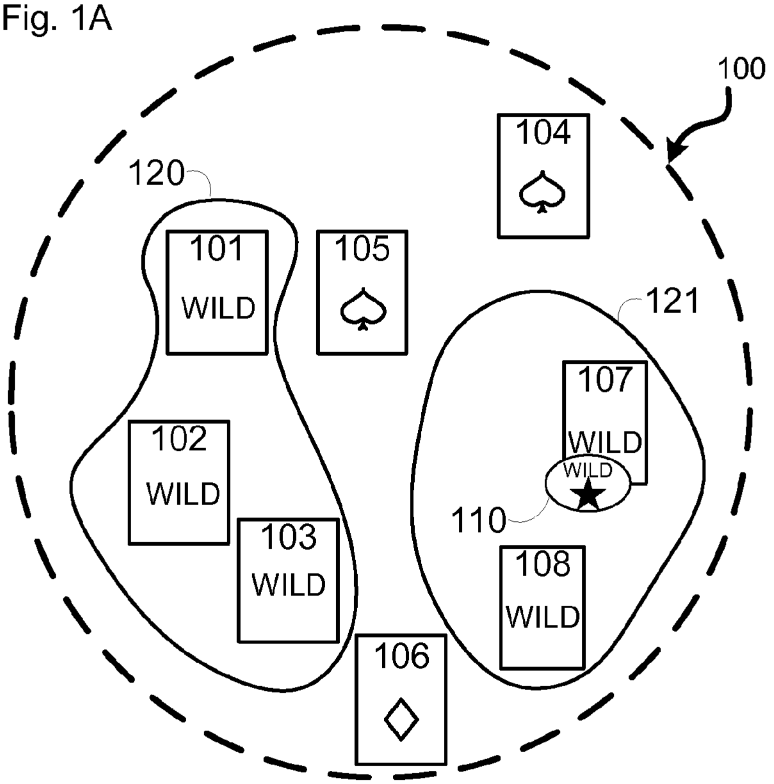

The differences between FIGS. 1A-B demonstrate that the wild indicator 110 has moved from a top-center position in the play area 100 in FIG. 1A to a lower-right position in the play area 100 in FIG. 1B. FIG. 1B further shows that the wild indicator 110 moved to overlap game element 107. According to the game play rules of various embodiments, including FIGS. 1A-B, a game element can exhibit wild functionality when the game element is overlapped by the wild indicator 107. Because the wild indicator 110 moves within the play area 100, some subset or all of the game elements 101-108 stand some chance of being overlapped by the wild indicator 110 and thereby exhibiting wild functionality for any round. Likewise, the wild indicator 110 can be moved to a position that does not overlap a game element, such that no game elements 101-108 exhibit wild functionality for the particular round of game play.

FIG. 1B also shows identification of two wild regions 120 and 121. Wild regions can be randomly located or selected from a plurality of regions. In FIG. 1B, two wild regions 120 and 121 have been located to respectively enclose game elements 101-103 and 107-108. According to the game play rules of various embodiments, including FIGS. 1A-B, a game element can exhibit wild functionality when the game element is enclosed within a wild region, such as either of wild regions 120 and 121. The respective markings of elements 101-103 and 107-108 have been removed because these elements have wild functionality, which supersedes the functionality a single symbol marking provides.

According to the embodiment of FIGS. 1A-B, as well as various others referenced herein, game elements that are overlapped by wild indicator or enclosed within a wild region exhibit wild functionality. Wild functionality allows a game element to correspond to any other game elements, regardless of how the other game element is marked, to form winning groups of game elements and trigger payouts. For example, a group of seven corresponding markings present in the play area 100 may be required to trigger a payout, such as seven heart markings or seven spade markings on elements. While seven common markings might not be present in a play area, game elements with wild functionality may correspond to any other game element marking, such as spade and/or heart, to complete one or more winning sets of seven correspondingly marked elements.

For example, in FIG. 1B seven game elements 101-105 and 107-108 either have spade markings (elements 104-105) or are marked as wild (elements 101-103 and 107-108) to function as those they are marked with spade symbols and correspond to the spade symbol marked elements 104-105. As such, if seven corresponding elements trigger a payout, then elements 101-105 and 107-108 would trigger such a payout.

Game element 107 is subject to two different mechanisms that each cause the game element to exhibit wild functionality (specifically, overlap by wild indicator 110 and being within wild region 121). However, despite being wild twice-over by these two mechanisms, the game element 107 only needs to be indicated as wild once to gain the full benefit of being wild. As such, it would seem as though there is no benefit accrued in the current round to game element 107 being indicated as wild twice-over relative to being indicated as wild once over.

Figure 2A:
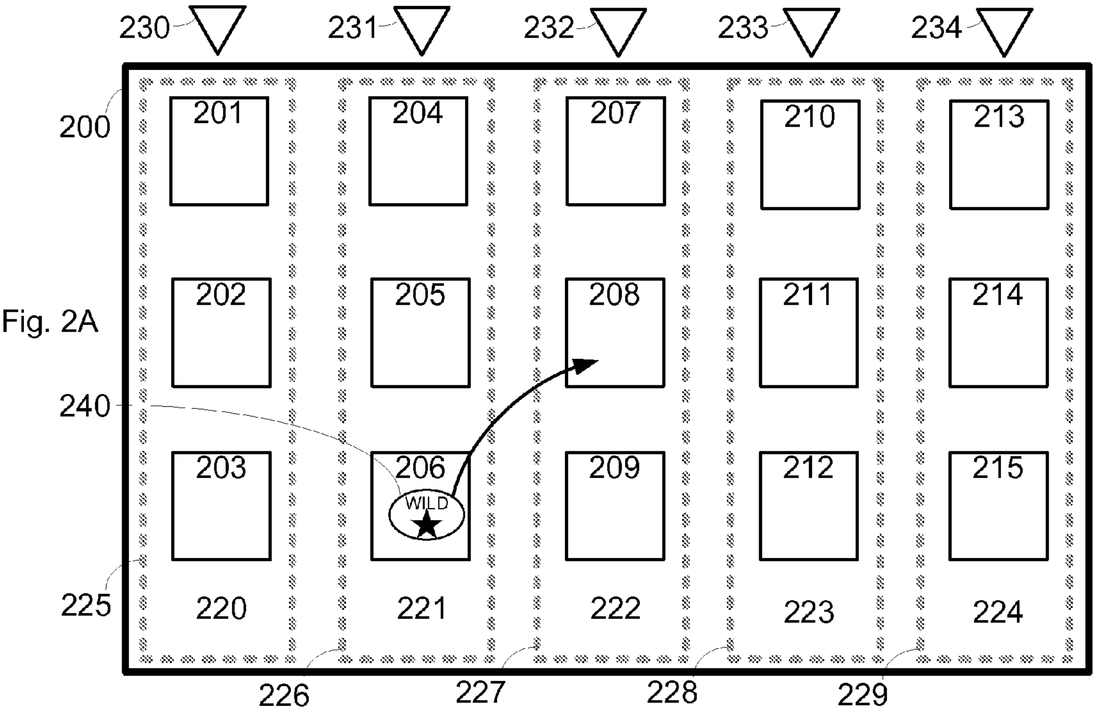
FIGS. 2A-B illustrates an embodiment of a gaming activity utilizing specialized wild functionality in accordance with aspects of the invention.
Figure 2B:
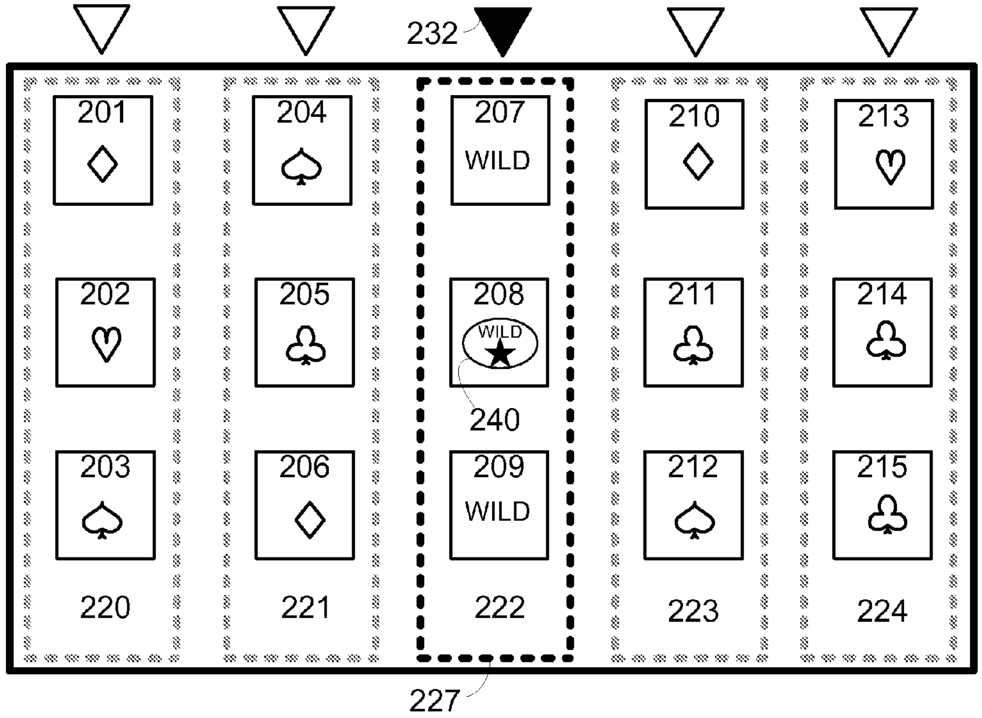

A game player may be somewhat disappointed in the game play outcome shown in FIG. 1B, considering that players often eagerly await the presentation of wild elements, and in FIG. 1B a wild is seemingly wasted by doubling-up on game element 107. However, the present disclosure addresses this situation by providing a specialized wild functionality benefit to the player outside of the present game play round. For example, in the embodiment of FIG. 1B, multiple bonus rounds of the game can be granted to the player based on the wild indicator 110 overlapping a game element 107 that is also designated wild by presence of the game element 107 in the wild region 121, the player not having to wager credit in the bonus rounds but still having the opportunity to win credit. In this way, the player receives a specialized benefit outside of the current game play round for having a game element be designated as wild twice over, where the multilayered wild designation cannot provide a further benefit in the current round besides being wild. FIGS. 2A-B further explores these aspects.

FIGS. 2A-B illustrate various aspects of the present disclosure. FIG. 2A illustrates a play area 200 inside of which are a plurality of game elements 201-215. Also within the play area 200 are a plurality of regions 220-224 arranged as columns, each of the regions respectively enclosed within region boundaries 225-229. The game elements 201-215 are distributed between the regions 220-224. All elements of play area 200 are squares. However, according to various other embodiments of this disclosure, elements of could take the form of, but are not limited to, circles, ovals, triangles, pentagons, hexagons, octagons, and the like.

FIG. 2A also illustrates a plurality of region status indicators 230-234, the region status indicators 230-234 each indicating the wild status of regions 220-224 respectively. In the embodiment of FIGS. 2A-B, any of the regions 220-224 can be selected as a wild region. When a region is selected as a wild region, then all game elements within the selected region exhibit wild functionality. In FIG. 2A, none of the region status indicators 230-234 are differentiated from one another, and as such none of the regions 220-224 are as yet wild regions. However, in FIG. 2B status indicator 232 is graphically distinguished, indicating that region 222 is a wild region, as further shown by region boundary 227 being highlighted. In some embodiments, a random selection is done between the region status indicators, such as indicators 230-234, and the region associated with the randomly selected region status indicator becomes a wild region.

FIGS. 2A-B also illustrates a roving wild indicator 240. In the game play stage of FIG. 2A, the roving wild indicator 240 is located within game element 206, but indicated to be moving to game element 208.

According to various embodiments, a roving wild indicator, such as 240, moves within a play area, such as 200, during each round of game play. In some embodiments, the roving wild indicator can move only to game elements adjacent to a game element at which the roving wild indicator resided in the previous round of game play. In this way, the roving wild indicator can be anchored in that in can move only a limited distance each game play round, and cannot move to any game element in each game play round. In some embodiments, a roving wild indicator can only move vertically and laterally, but not diagonally. In some embodiments, a roving wild indicator can move only one space (i.e. to the next element) in any direction, including vertically, laterally, and as illustrated in FIGS. 2A-B, diagonally, each round.

In some other embodiments, the roving wild indicator can move to game elements not adjacent to a game element at which the roving wild indicator resided in the previous round of game play. For example, a roving wild indicator, such as 240, can move an unlimited number of game element spaces each round of game play, such that in any round of game play the roving game element could land on any game space or game element.

FIGS. 2A-B demonstrate the multiple game layers that can be applied to greatly enhance game play dynamics. For example, instead of merely watching the elements of each column (which could respectively be reels) spin and then align or not align, a player anticipates which of the regions 220-224 will be made wild, where the roving wild indicator 240 will stop, and how the elements 201-215 will be populated with symbols. These multidimensional gaming aspects provide several benefits. A player may feel slightly overwhelmed with keeping track of the unfolding of each round because of the variety of different game mechanics at play. This aspect overcomes the monotonous and predictable manner of conventional game play.

Also, the multiple layers of game play can draw each round out longer, thereby keeping the player excitedly watching in anticipation as the various game events unfold. Increasing player excitement and anticipation makes game play more enjoyable and keeps the attention of the player for longer periods. Entertained players play longer.

In addition, the more chances for game events to unpredictably help the player, the greater sense that the player has that game momentum will soon breaker in his or her favor. Players enjoy games that seem as though they could break in favor of the player at any time. Making elements wild is a great way to give players the impression that big wins could be imminent, and providing multiple different mechanisms (e.g., a roving wild indicator and selection of a wild region) to make elements wild allows a game greater opportunity to surprise a player with a wild and therefore always keep the player holding out hope for getting a wild in just the right place.

However, having two different mechanisms for making any particular element wild presents its own problem, where the two different mechanisms could make the same element wild. In such a case, the player essentially loses a wild because the element does not function in a manner with any more wild functionality when made wild the second time. The present disclosure addresses this situation by providing specialized wild functionality when two different wild mechanisms make the same element wild.

In the stage of game play illustrated in FIG. 2B, game elements 201-215 are marked with symbols and region status indicator 232 is highlighted to indicate that region 222 has been selected as a wild region. Accordingly, the elements within the region 222 have been indicated as wild, superseding any other symbol types that would have otherwise been marked to elements 207-209. Moreover, the roving wild indicator 208 has been moved to game element 208. As such, game element 208 has been designated as wild by two separate and distinct wild designation mechanisms. In this way, game element 107 is subject to intersecting wild designations. However, as discussed herein, exhibiting wild functionality is binary, and element 208 cannot become any more wild based on being designated as wild by two separate and distinct wild designation mechanisms as compared to one. As such, the embodiment of FIGS. 2A-B, as well as others referenced herein, provides additional functionality beyond the current game play round for rewards to accrue to the player.

For example, a player can be rewarded with one or more free spins, where the game elements 201-215 are re-marked in subsequent game play rounds, providing additional opportunities to form winning series of corresponding game elements without having to pay or wager additional money.

In some embodiments, in-game bonuses are provided that can change the outcome of the current round. For example, game element 208 may count as wild two elements based on two different mechanisms designating it wild, wherein if a series of five adjacent game elements with corresponding markings are needed to generate a payout, then the series of elements 205-208-211-214 could generate a payout if element 208 was counted as two club markings.

Figure 3:
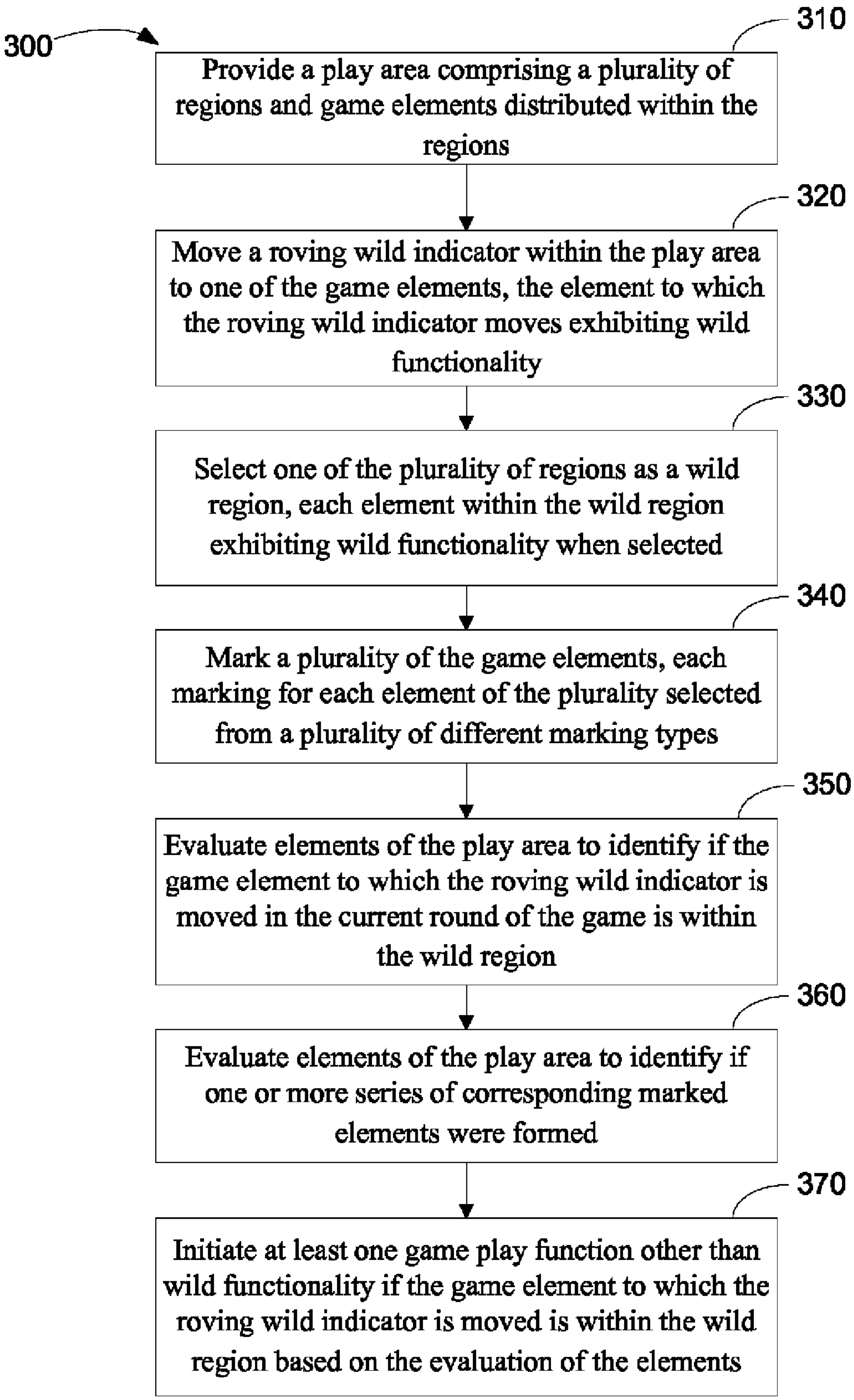
FIG. 3 is a flow diagram of an exemplary embodiment of a method for utilizing specialized wild functionality in accordance with aspects of the invention.

FIG. 3 is a flow diagram of a method 300 for utilizing aspects of the present disclosure, including specialty wild functionality. The steps of the method 300 can correspond to the steps of the various embodiments referenced herein, including FIGS. 1A-2B and FIGS. 4A-H. The method 300 includes providing 310 a play area comprising a plurality of regions and game elements distributed within the regions. In some embodiments, the game elements are distributed equally amongst the regions (e.g., three vertically aligned elements to a region) and in some other embodiments unequal numbers of game elements are located within the respective regions.

The method 300 can further include moving 320 a roving wild indicator within the play area to one of the game elements, the element to which the roving wild indicator moves exhibiting wild functionality. The movement of the roving wild indicator can be limited, such as a move of one game element space (i.e. the move ending at a game element adjacent to a game element at which the roving wild indicator started moving), or the movement can be unlimited.

The method 300 can further include selecting 330 one of the plurality of regions as a wild region, each element within the wild region exhibiting wild functionality when selected. In some embodiments, each element within the wild region is marked as wild, while in some other elements the wild region is generally marked as wild with no particular markings placed on the elements within the wild region.

The method 300 can further include marking 340 a plurality of the game elements, each marking for each element of the plurality selected from a plurality of different marking types. In some embodiments, a particular type of marking can be repeatedly used to mark elements. In other embodiments, a particular type of marking can only be used to mark elements a certain number of times in a particular game or round (e.g., only 5 elements can be marked with a spade symbol).

After the roving wild indicator has been moved 320 and the wild region has been selected 330, elements of the play area can be evaluated 350 to identify if the game element to which the roving wild indicator was moved in the current round of the game is within the wild region. Additionally, after the plurality of game elements has been marked 340, elements of the play area can be evaluated 360 to identify if one or more series of corresponding marked elements were formed. Payouts can be issued for each identified series of corresponding marked elements.

At least one game play function other than wild functionality can be initiated 370 if the game element to which the roving wild indicator was moved is within the wild region based on the evaluation 350 of the elements. The game play function can be any of the play functions described herein, such as crediting the player with a number of bonus free plays. The bonus event can have a much higher probability of winning, thereby instilling a great interest by players in being awarded bonus events.

The steps of the method 300 do not need to be performed in the order presented. While the order of steps in the method 300 is one embodiment, other embodiments have slight variations on the inclusion and/or order of various steps. For example, steps 320, 330, and 340 could be swapped in any order or any two or more of them could be performed simultaneously. Step 370 could be performed before steps 340 as long as it was after step 350.

Some embodiments may only include steps 320, 330, 350, and 370. Some embodiments concern causing movement of a roving wild indicator within a play area to one of a plurality of game elements, selection of one of a plurality of regions of the play area as a wild region, and initiation of at least one bonus game play function if the game element to which the roving wild indicator is moved is within the wild region. Some embodiments may not designate elements as wild using the mechanisms of FIG. 3 (i.e. a roving wild and selection of the wild region), but may provide one or more means for associating elements with wild functionality and providing a bonus beyond mere wild functionality if an element is designated as wild two or more times in a single game play round.

Figure 4A:
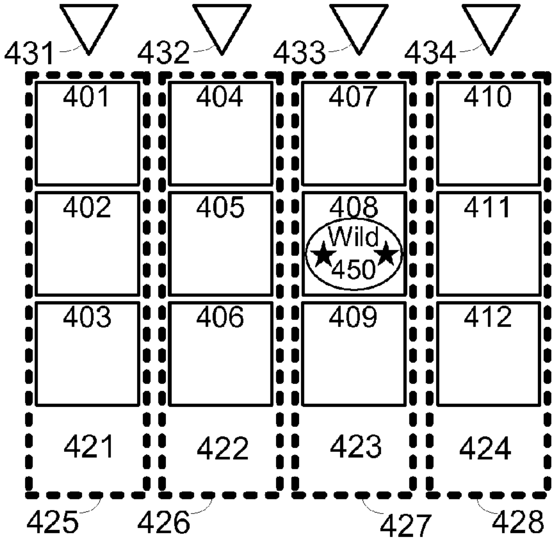
FIGS. 4A-H illustrates one embodiment of a gaming activity utilizing specialized wild functionality in accordance with aspects of the invention.

FIGS. 4A-H illustrate multiple stages of a round of game play that demonstrates various aspects of the present disclosure. These stages can correspond to the method steps and aspects described in connection with FIGS. 3 and 5 and elsewhere herein. FIG. 4A illustrates a plurality of unmarked game elements 401-412, the game elements distributed between a plurality of regions 421-424. Each of the regions 421-424 is bounded by respective boundaries 425-428. Each of the regions 421-424 is also associated with respective status indicators 431-434 indicating the status of each region. In FIG. 4A, none of the region status indicators 431-434 are highlighted, which indicates that none of the regions 421-424 are as yet wild regions.

Figure 4B:
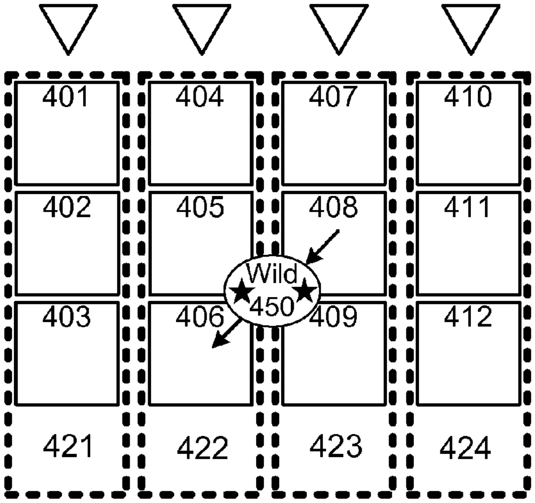

FIG. 4B illustrates the game stage subsequent to the stage of FIG. 4A. In FIG. 4B, the roving wild indicator 450 is shown moving from element 408 to element 406. In some embodiments the roving wild indicator 450 can move from element 408 to any other element, such as element 401. However, in some other embodiments, the wild indicator can only move to a space adjacent to the space at which it started in the round. For example, elements 408 and 406 are adjacent to one another. Any of elements 404-407 and 409-412 are adjacent to element 408, but elements 401-403 are not adjacent element 408.

Figure 4C:
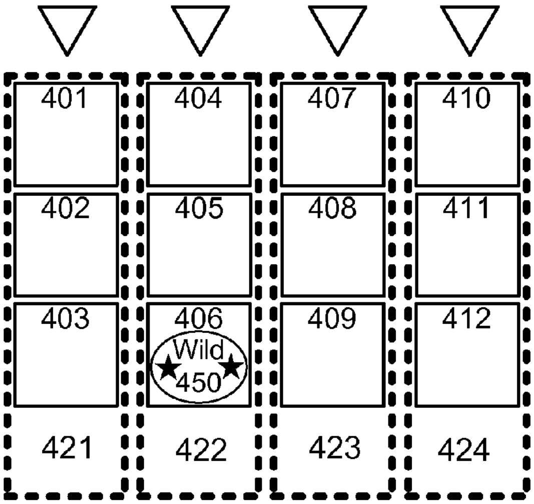

In some embodiments, a player can direct the element to which the roving wild indicator 450 moves in each round. In some embodiments, a player can direct the direction in which the roving wild indicator 450 moves, but not the exact element at which the roving wild indicator 450 rests in each round. FIG. 4C shows that the wild 450 was relocated to element 406.

In various embodiments, the element to which a wild indicator moves is randomly selected from all of the possible elements that the wild indicator could move. Randomly moving the wild indicator 450 at this stage provides one of the many layers of unpredictability in the game of FIGS. 4A-H. For example, markings for the elements 401-412 will also be randomly selected. One of the regions 421-424 may also be selected as a wild region. Each of the stages provides an additional interwoven layer to the game that draws the game out over multiple stages, thereby also drawing out the player's anticipation as the player watches each randomized stage unfold.

In various embodiments, a roving wild indicator has permanence in the play area, as the roving wild indicator is always within play area. Such permanence can be enticing to a prospective player because he or she knows that at least one wild is guaranteed. A roving wild indicator can move around the play area in the sense that it is at one game element for one round and then at a different game element for a different round, even though the roving wild indicator is not shown to graphically travel between the two game elements. However, in some embodiments the roving wild indicator does move to different game elements by being shown to graphically travel around the play area. Graphically showing the travel of the roving wild indicator can be especially entertaining and exciting as the player watches movement of the roving wild indicator and wonders where it will stop.

Figure 4D:
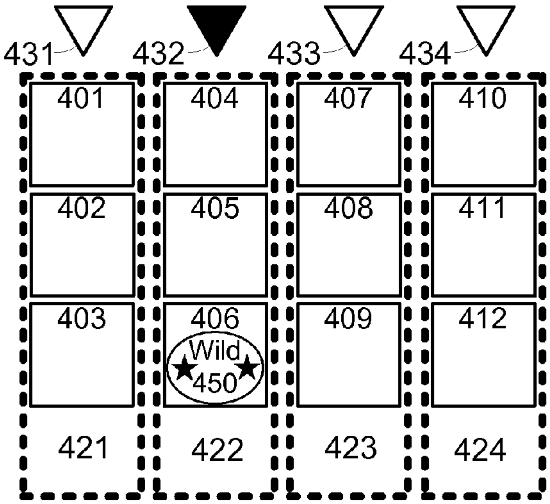

FIG. 4D shows that indicator 432 has been highlighted. Indicator 432 can be randomly selected from the plurality of indicators 431-434 for being highlighted.

In some embodiments, a player can select which of the indicators 431-434 is highlighted. In such embodiments, the particular indicator should be selected by the player before the wild indicator 450 has begun or stopped moving for that particular round of game player, otherwise the player could easily align the highlighted indicator with the wild indicator 450 instead of such alignment being based on chance.

Figure 4E:
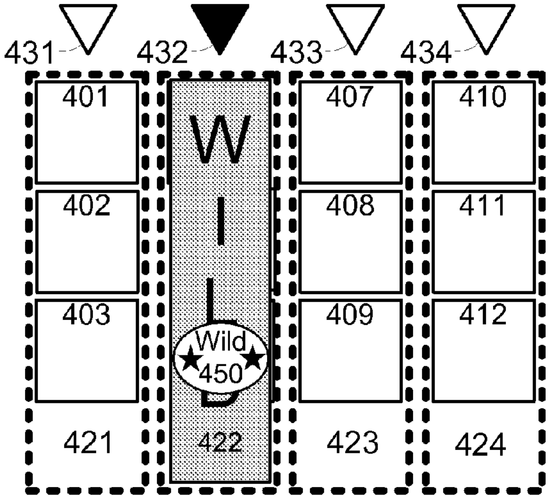

Based on indicator 432 being selected relative to the other indicators 431, 433, 434, the entire region 422 associated with the selected indicator 432 has become a wild region, as graphically indicated in FIG. 4E. Because region 422 is a wild region, the region functions as a single wild block and/or as multiple stacked wilds which can correspond to any adjacent elements (e.g., 401-403 and 407-409) to form winning element series.

In various embodiments, it is the game stage of FIG. 4E that elements are evaluated to determine whether the roving wild indicator 450 is within a region that has been designated a wild region for that round. In this way, two different wild designations associated with two different wild designating mechanisms are intersecting. Had the roving wild indicator 450 moved to element 409 or 412, then the evaluation of the elements would determine that the roving wild indicator 450 is not within the wild region 422. Alternatively, the same outcome could be had if a different region had become the wild region, such as any of regions 421, 423, or 424. However, in the particular embodiment of FIG. 4E, the roving wild indicator 450 is within the wild region 422.

Several game events and functions can be triggered by the presence of the roving wild indicator 450 within the wild region 422. For example, one or more bonus games can be triggered whereby the player can play the game without having to wager more money. Such a bonus recognizes that a wild element cannot become any more wild when two separate mechanisms both indicate that an element is wild, and therefore provides a reward to the player that is outside of the current round (i.e. the reward does not affect the outcome of the current round of game play).

Figure 4F:
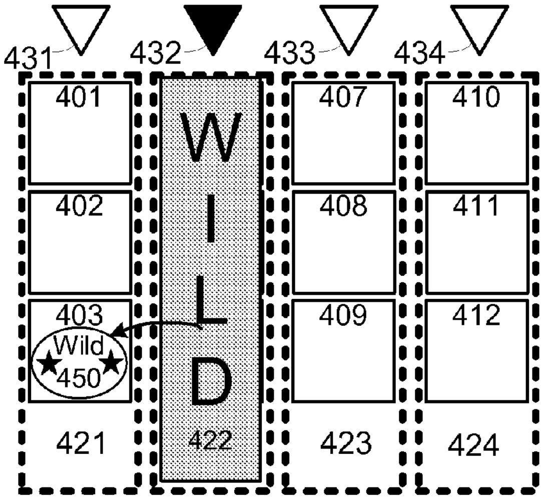

In some embodiments, a wild region can displace a roving wild indicator when it is determined that the roving wild indicator is within the wild region. For example, FIG. 4F illustrates the roving wild indicator 450 moving from the wild region 422 to element 403, which is outside of the wild region 422. Such a step feature recognizes that there is not an in-game benefit to an element being doubly wild, and therefore bumps the roving wild indicator 450 to another game element 403 where it can independently make a game element wild and therefore be consequential within the current game play round.

In some embodiments, a bumped roving wild indicator will be relocated to an element adjacent to the game element at which the roving wild indicator was located when the region in which the roving wild indicator was located became a wild region. For example, in FIG. 4F the roving wild indicator could be relocated to elements 402, 403, 408, or 409. In some other embodiments, a roving wild indicator can be relocated to any other game element that is not within the wild region. For example, in FIG. 4F the roving wild indicator could be relocated to elements 401-403 or 407-412, regardless of adjacency.

The element to which a roving wild indicator is relocated could be randomly selected from the elements to which the roving wild indicator could be moved, or the roving wild indicator could be relocated in some predetermined fashion, such as always being bumped to the left, and if not available, to the right.

In some embodiments, an out-of-play-area indicator, such as indicator 432, graphically comes into the play area when it is selected to indicate a region as a wild region. For example, when indicator 432 is selected, it could graphically sweep over the region 422 leaving the WILD block behind in the region 422 (or it could leave WILD markings on each of the elements in the region 422). Additionally or alternatively, the WILD block in region 422 could be made to sweep into cover the region, such as sweeping in from the top of the column to quickly cover the whole columnar region 422. In such sweeping action, the WILD block could be made to graphically bump the roving wild indicator 450 out of the way, as shown in FIG. 4F. Such graphics can serve to underscore the dynamic between the interwoven layers of game play mechanics as described herein, specifically, the issue of two different mechanisms making the same element wild.

Figure 4G:
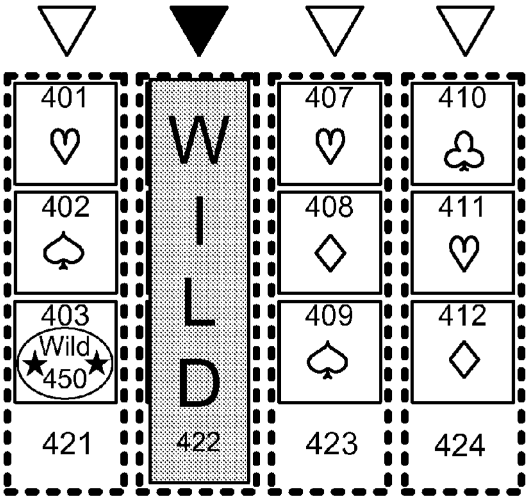

FIG. 4G illustrates the stage of game play where elements are populated by markings. Elements with wild functionality are not marked with symbols in this step because these elements already exhibit wild functionality and will correspond to all other elements. Each symbol for marking of each element can be randomly selected from a plurality of symbol types (e.g., heart, diamond, club, and spade symbol types following a card game theme).

Figure 4H:
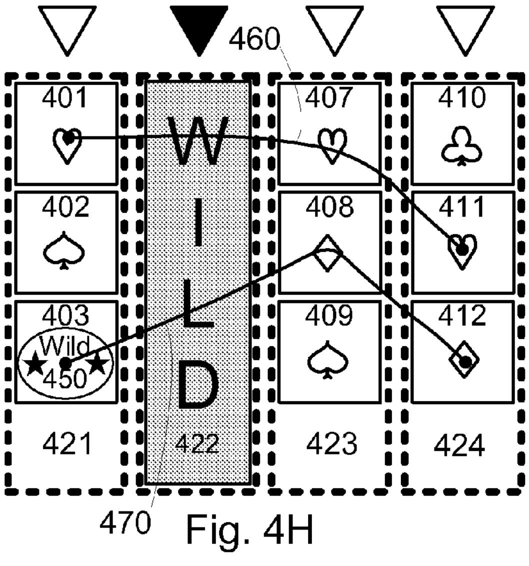

FIG. 4H illustrates a stage of game play where elements are evaluated to identify one or more series of adjacent corresponding elements. Accordingly to the payout rules of the particular embodiment of FIG. 4H, four correspondingly marked adjacent elements must for aligned to trigger a payout. Line 460 traces a series of elements forming a series of adjacent corresponding elements. Line 460 traces a series of adjacent corresponding elements because elements 401, 407, and 411 are marked with respective heart symbols and region 422 is a wild region, which means that the region 422 functions as though it was also marked with a heart symbol.

Line 470 traces a series of elements forming a series of adjacent corresponding elements. Line 470 traces a series of adjacent corresponding elements because elements 408 and 412 are marked with respective diamond symbols, region 422 is a wild region (which means that the wild region functions as though it was also marked with a diamond symbol), and element 403 contains the wild indicator symbol 450 (which means that element 403 functions the same as the wild region 422 and therefore also functions as though it was marked with a diamond symbol).

In the particular embodiment illustrated in FIGS. 4E-H, correspondence between elements requires not only an identical symbol marking, but also that a minimum number of identically marked elements (or functional equivalents, i.e. wilds) are displayed in a round of game play (e.g., the minimum being four). As such, even though two spade symbols are shown in elements 402 and 409 on opposite sides of wild region 422, they do not correspond according to the illustrated embodiment, because the threshold number of identical elements for correspondence is four. However, some embodiments are not so limited, and in some other embodiments, any other number could be required for the elements to correspond, including two identically marked symbols.

While elements 401, 407, and 411 correspond to one another by each having an identical marking, there are various other ways in which elements can correspond to one another, according to various embodiments. For example, elements could correspond to one another not by having the same mark, but rather by just having a mark (e.g., as in embodiments were only some of the elements are marked). But in some embodiments, elements will only correspond if they have the same letter, number, symbol, image, color, or other similar marking. In some embodiments, elements will correspond if they are marked with markings selected from a particular group, and the elements need not all have identical markings to correspond to one another. For example, elements may correspond to one another because each is marked with an image of a dog, even though all image markings on the elements are of a different breed of dog.

In some embodiments, elements correspond to one another if their markings form a progressive series. In such embodiments, adjacent elements might only correspond if they are marked with consecutive numbering. In other embodiments, letter marked elements may only correspond if the adjacent elements spell a word. In some embodiments, marked elements may correspond if a word can be spelled from the marked elements of an array, regardless of whether the elements are adjacent to one another.

Elements 407 and 411 not only correspond to one another, but also help form a series of adjacently located elements. There are many different ways in which an element of the various embodiments of the invention can be adjacent to another element. For example, two elements could be considered to be adjacent to one another if they share a common corner. However, various embodiments do not consider the mere sharing of a corner to make two elements adjacent.

Two elements may share a common wall despite there being a small gap illustrated between the framing of each element. Two square elements may be adjacent in various embodiments because their respective proximate and opposing walls are aligned against one another. Adjacency in this sense, for this particular embodiment, relates to the concept of how the elements of a play area are orientated with respect to each other and not precisely how each element is illustrated.

According to various embodiments, elements in contact with and/or within close proximity to one another can be considered to be adjacent. Elements can be in contact with one another by sharing walls, lines, points, segments, portions and/or features. Elements can also be in contact by overlapping each other. Other types of adjacency may be provided as well. For example, in one embodiment, only those symbols that are adjacent in a horizontal, vertical, or diagonal fashion will be deemed "adjacent" for purposes of providing a payout. Alternatively, only symbols that are horizontal, or that are vertical, or that are diagonal, may be deemed adjacent. Symbols may also be deemed adjacent along opposite edges of the play area, as if the edges were wrapped around to intersect with one another. Three dimensional display grids may also be used in accordance with the embodiments referenced herein, such that elements sharing a wall, corner or segment may be considered to be adjacent.

In various embodiments, a series of corresponding adjacent elements can be dynamically identified. Dynamic identification includes locating winning segments that can take any number of forms. As opposed to classic three reel strip slot matching, where a series of winning symbols could only be formed along one row, dynamic identification allows segments to be formed in many other ways, including segments that repeatedly change direction along their length. For example, a payline moving left-to-right could start in a top row on the left hand side of the play area and end in a lower row on the right side of a play area.

In various embodiments of the invention, pay lines may need to be enabled for a particular game. For example, a player may be required to place a unique bet for each particular pay line. In such a case, a player not enabling all pay lines may be given the opportunity to select which pay lines will be enabled, wherein only those pay lines that are enabled can be used to form a series of corresponding adjacent elements that triggers a payout. In various embodiments of the invention, marked elements will still appear along non-enabled pay lines, but a series of adjacent corresponding elements within those series will not trigger a payout and/or trigger additional rounds. In some embodiments of the invention, a series of adjacent corresponding elements in a non-enabled pay line may trigger an additional round, but not a payout. Alternatively, a series of adjacent corresponding elements in a non-enabled pay line may trigger a payout, but not an additional round.

Figure 5:
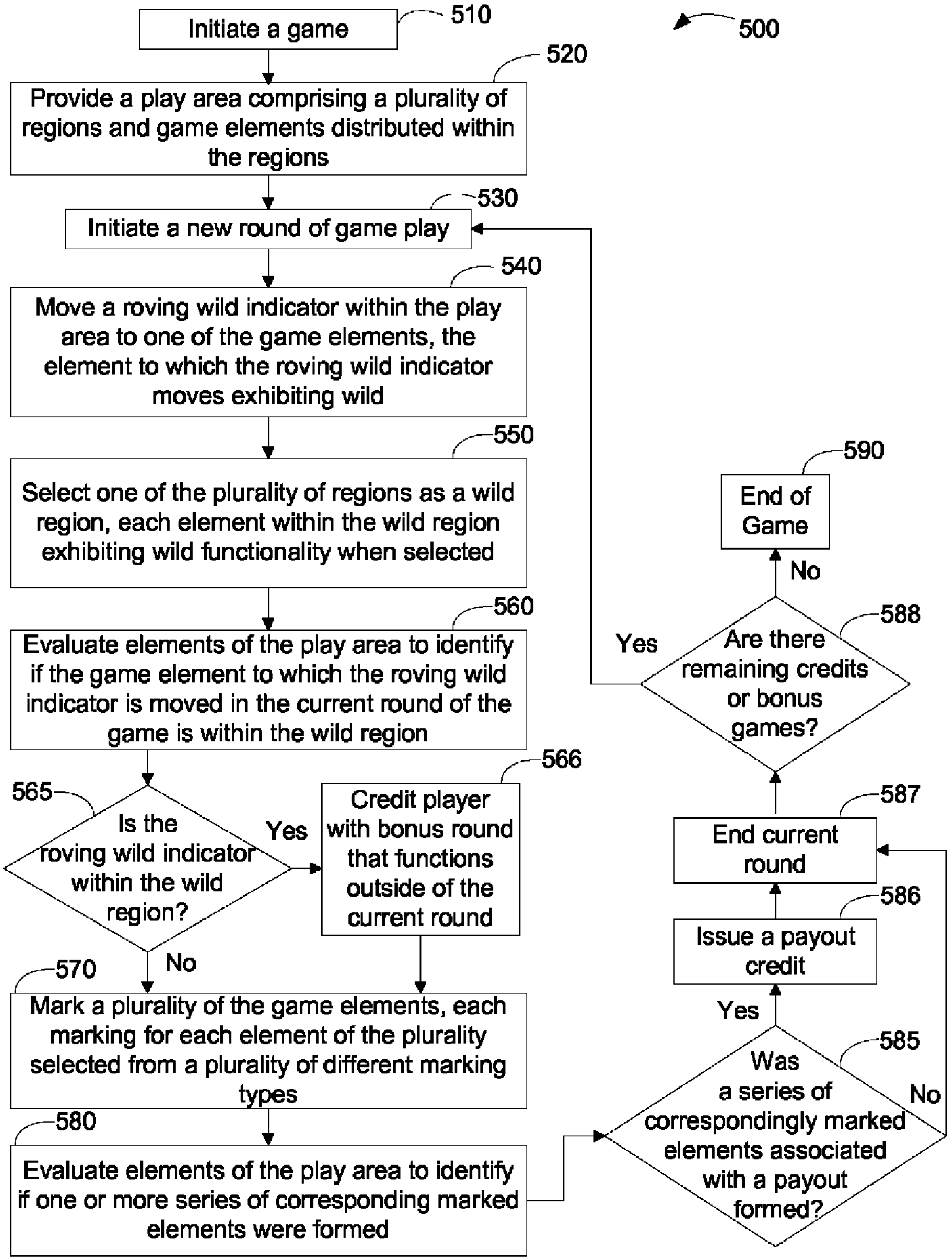
FIG. 5 is a flow diagram of an exemplary embodiment of a method for utilizing specialized wild functionality in accordance with aspects of the invention.

FIG. 5 is a flow diagram of a method 500 embodiment of the present disclosure. The method 500 of FIG. 5 demonstrates how a game of the present disclosure can loop through several rounds by accruing bonus games associated with specialty wild functionality. A player initiates 510 a game, for which a play area comprising a plurality of regions and game elements distributed within the regions is provided 520. After initiating 510 the game, a new round is initiated 530. The new round could be the first round of game play (if step 520 is the preceding step) or a subsequent round of game play (if step 588 is the preceding step).

After the initiation 530 of a new round of game play, a roving wild indicator is moved 540 within the play area to one of the game elements. The element to which the roving wild indicator moves 540 will exhibit wild functionality for at least a portion of the current round, and typically for the entire round.

In each round of game play, one of the plurality of regions is selected 550 as a wild region, each element within the wild region exhibiting wild functionality when selected. As discussed herein, a region indicator outside of the play area may be selected relative to other off screen indicators, and the region associated with the selected off screen indicator becoming the wild region.

After movement 540 of the roving wild indicator and selection 550 of the wild region, elements of the play area are evaluated 560 to identify if the game element to which the roving wild indicator is moved 540 in the current round of the game is within the wild region. In this way, step 560 evaluates whether two different wild designations are intersecting. If the roving wild indicator is within the wild region, then the method 500 advances to step 566, and if the roving wild indicator is not within the wild region, then the method 500 advances to step 570, according to decision block 565.

If the roving wild indicator is within the wild region, then the player is credited 566 with one or more bonus rounds that function outside of the current round. Regardless of whether the roving wild indicator is within the wild region, a plurality of the game elements is marked 570. Each marking for each element of the plurality is selected from a plurality of different marking types (e.g., in some embodiments a heart, diamond, club, or spade symbol is randomly selected for each element).

The marking step 570 serves to populate the play area. After the play area is populated, elements of the play area are evaluated 580 to identify if one or more series of corresponding marked elements were formed. Rules regarding the formation of a series of correspondingly marked elements for the method 500 can follow any of the rules referenced herein. If a series of correspondingly marked elements associated with a payout was formed 585, then a payout is issued 586, which can include crediting the player with money which can be used to initiate 530 more game rounds.

Regardless of whether a series of correspondingly marked elements associated with a payout was formed, the current round ends 587. If there are remaining credits or unplayed bonus rounds 588, then a new round can be initiated 530. If there are no remaining credits or unplayed bonus rounds 588, or the player chooses not to use any of the existing credits for a new round (i.e. cash out), then the game ends 590.

Although the steps of the method 500 are arranged to occur in a certain order, other ordering schemes of these steps are contemplated as a part of this disclosure. For example, step 550 could precede step 540, or these steps can occur simultaneously. Moreover, step 570 could precede either or both of steps 540 and 550.

Variations can be made within the steps themselves. For example, some embodiments concern methods and circuitry for using a first game play mechanism for designating one or more game elements of a play area wild, using a second game play mechanism for designating one or more game elements of a play area wild, the first game play mechanism different from the second game play mechanism, and awarding a player with bonus functionality other than wild functionality if the first game play mechanism and the second game play mechanism both made the same element wild. In such embodiments, the mechanisms need not be a roving wild indicator and selection of a whole wild region. Further variations concern methods and circuitry for designating multiple game elements of a play area wild in each of the plurality of rounds of a game, and awarding a player with bonus functionality other than wild functionality if a game elements is twice designated as wild in a single round.

Figure 6:
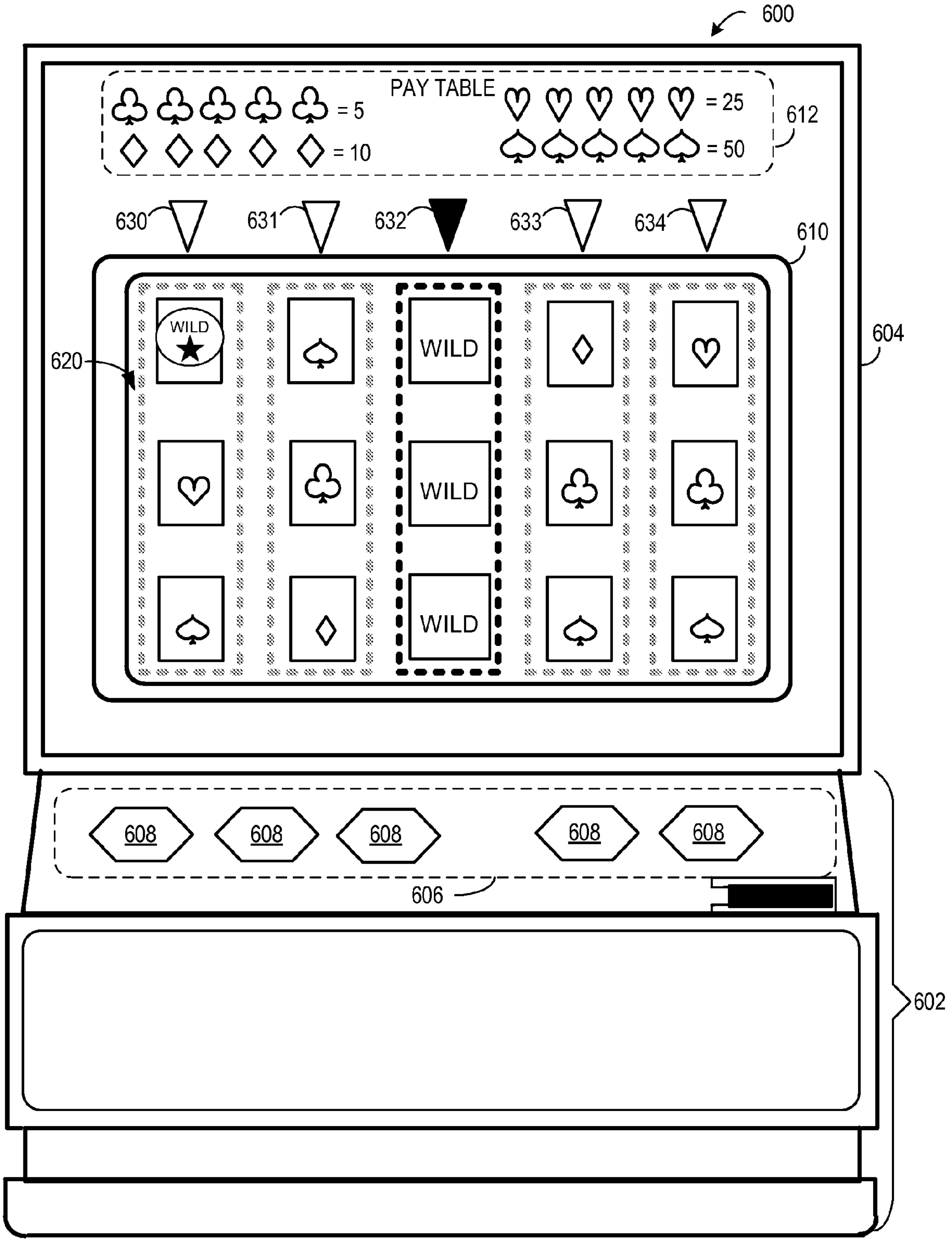
FIG. 6 is an embodiment of a casino-style gaming device in which the principles of the present invention may be applied.

FIG. 6 is an embodiment of a casino-style gaming device in which the principles of the present invention may be applied. The slot machine 600 is a structure including at least a computing system, a housing, and a display. The housing includes a base 602 and a display device 604 to allow the slot machine 600 to be a self-supported, independent structure. The base 602 includes structure supporting the slot machine 600, and also includes a user interface 606 to allow the user to control and engage in play of the slot machine 600. The particular user interface mechanisms associated with user interface 606 is dependent on the type of gaming machine. For example, the user interface 606 may include one or more buttons, switches, joysticks, levers, pull-down handles, trackballs, voice-activated input, or any other user input system or mechanism that allows the user to participate in the particular gaming activity. The user input 606 allows the user to enter coins or otherwise obtain credits through vouchers, tokens, credit cards, etc. Various mechanisms for entering such vouchers, tokens, credit cards, coins, point tickets, etc. are known in the art. For example, coin/token input mechanisms, card readers, credit card readers, smart card readers, punch card readers, and other mechanisms may be used to enter wagers. The user input may include a plurality of buttons 608, which allow the user to initiate game play, enter a number of credits to play, select options, cash out, automatically bet the maximum amount, etc. It should be recognized that a wide variety of other user interface options are available for use, including pressing a button on a gaming machine, touching a segment of a touch-screen, entering text, entering voice commands, or other known user entry methodology.

The display device 604 of FIG. 6 includes a display screen 610. The display device may take on a variety of forms depending on what type of presentation is to be provided. For example, a slot game play area 620 is provided where the slot gaming activity in accordance with the invention is displayed. The slot game play area 620 can function as the play area described herein. The video display screen may be implemented in a variety of manners, including electronically represented with outputs shown on conventional electronic displays, such as a liquid crystal displays (LCD), dot matrix, plasma, CRT, LED, electro-luminescent display, or generally any type of video display known in the art.

Various types of grids, and ways to display them, are contemplated in the scope of the invention, including vertical, horizontal, and/or diagonal lines creating spaces of rectangles and/or squares. A display grid could also be comprised of triangles, hexagons, ovals, circles and other shapes.

A grid can be presented in various ways. For example, a display grid could be comprised of several reel strips with various markings on the periphery of the reel strips. Several reel strips with a common axis placed together can form a grid, with each reel strip representing a vertical column and adjacent markings on the aligned reels representing a horizontal row. A display grid could also be printed or formed on a surface, such as a piece of paper or board. A grid could also be represented by projected light. An array could be presented, modified and used in any way that a grid could be presented.

A display grid can also be presented by use of video means, such as with a video slot machine. In a video slot machine, the reel strips are not represented by physical material, but rather include electronically stored symbol patterns, i.e., a virtual reel strip. By using virtual reel strips for each of the display series, segments or subsegments, there is no physical correlation between display series, segments or subsegments as there are with mechanical reel strips. For example, in the context of mechanical reel strips, three symbols presented in a column across three pay lines are physically restricted to that particular order, since the reel strip is presented across three rows. In some embodiments, there is no such relationship and each subpart of the grid can display a marking independent of any other subpart. Furthermore, there are other advantages by using video representation, including faster game play, greater flexibility in game types and variations, and representation of things that would otherwise be physically complicated or impossible.

Outside of the slot game play area 620 play area can be provided a plurality of status indicators 630-634. Each of the indicators can be associated with a different columnar region of the slot game play area 620. One of these status indicators 630-634 can be selected randomly each round of the game to determine and/or indicate which columnar region of the slot game play area 620 will be a wild region, with elements therein being wild. In some embodiments, the status indicators 630-634 could be part of the same screen in which the regions are displayed. As shown in FIG. 6, the status indicators 630-634 are outside of the play area 620. Each of the status indicators 630-634 could be a separate light. Each of the status indicators 630-634 could be a separate button in embodiments there the player selects which region is wild.

Associated with the display device 604 is an optional winning guide area 612, where information associated with the potential winning series lengths may be presented. This area may also provide an indication of the requisite symbols, symbol lengths, symbol combinations, symbol locations, etc. that result in winning payouts to the participant. This information may be part of the display screen 610, or alternatively may be separate from the display screen 610 and provided directly on a portion of the display device 604 structure itself. For example, a backlit colored panel may be used as the winning guide area 612. Further, this information may be provided on an entirely separate display screen (not shown). The winning guide area 612 can display pay table information, as shown.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 7.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 700 of FIG. 7 is an example computing structure that can be used in connection with such electronic gaming machines, computers, or other computer-implemented devices to carry out operations of the present invention.

The example computing arrangement 700 suitable for performing the gaming activity utilizing expanding arrays and series of corresponding adjacent elements in accordance with various embodiments typically includes a central processor (CPU) 702 coupled to random access memory (RAM) 704 and some variation of read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals, communication signals, and the like.

Figure 7:
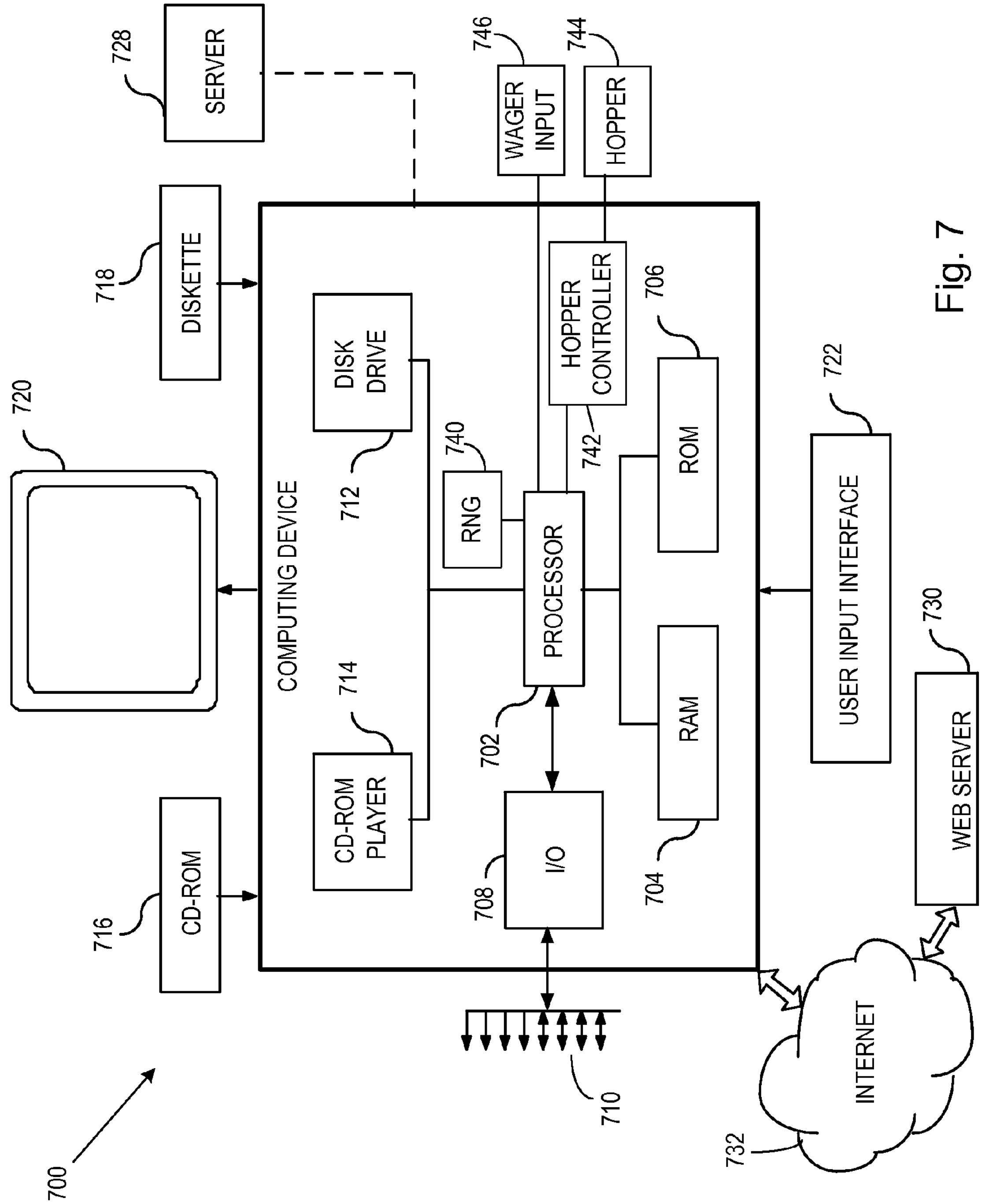
FIG. 7 illustrates circuitry capable of carrying out operations in accordance with aspects of the invention.

The circuitry represented in FIG. 7 can be wholly or partially housed within the embodiment of FIG. 6 and used to perform the various methodologies and techniques discussed herein (e.g., carry out the methods of FIGS. 3 and/or 5 to provide the game play aspects exhibited in FIGS. 1A-B, 2A-B, and/or 4A-H). RAM 704 and/or ROM 706 can be a computer readable medium encoded with a computer program, software, firmware, computer executable instructions, instructions capable of being executed by a computer, etc. to be executed by circuitry, such as processor 702. For example, RAM 704 and/or ROM 706 can be a computer readable medium storing a computer program, execution of the computer program by processor 702 causing movement of a roving wild indicator within a play area to one of a plurality of game elements, selection of one of a plurality of regions of the play area as a wild region, and initiation of at least one game play function other than wild functionality if the game element to which the roving wild indicator is moved is within the wild region. In similar ways, the other methods and techniques discussed herein can be performed using the circuitry represented in FIG. 7.

The exemplary device includes a processing/control unit (e.g., 702), such as a microprocessor, reduced instruction set computer (RISC), or other central processing module. The processing unit need not be a single device, and may include one or more processors. For example, the processing unit may include a master processor and one or more associated slave processors coupled to communicate with the master processor.

Chance-based gaming systems such as slot machines, in which the present invention is applicable, are governed by random numbers and processors. Electronic reels are used to display the result of the digital reels which are actually stored in computer memory and "spun" by a random number generator (RNG). RNGs are understood in the art, and may be implemented using hardware, software operable in connection with the processor 702, or some combination of hardware and software. In accordance with generally known technology in the field of slot machines, the processor 702 associated with the slot machine, under appropriate program instruction, can simulate the vertical rotation of multiple reels. Generally, the RNG continuously cycles through numbers, even when the machine is not being played. The slot machine selects, for example, three random numbers. The numbers chosen at the moment the play is initiated are typically the numbers used to determine the final outcome, i.e., the outcome is settled the moment the reels are spun. The resulting random numbers are generally divided by a fixed number. This fixed number is often thirty-two, but for slot machines with large progressive jackpots it may be even greater. After dividing, the remainders will be retained. For example, if the divisor was one-hundred twenty-eight, the machine would have three remainders ranging from zero to one-hundred twenty-seven. The remainders may be considered as stops on virtual reels. If the divisor was one-hundred twenty-eight, then the virtual reels would each have one-hundred twenty-eight stops with each stop being equally likely. Each stop on the virtual reel may be mapped to a stop on an actual reel or displayed reel image. These reel images may then be displayed on the display 720. The present invention is operable using any known RNG, and may be integrally programmed as part of the processor 702 operation, or alternatively may be a separate RNG controller 740. RNGs are well known in the art, and any type of RNG may be implemented for the standard mode of play and/or the bonus mode of play in accordance with the invention. Such methods and devices can be used to select elements and/or markings, among other things.

The computing arrangement 700 may also include one or more data storage devices, including hard and floppy disk drives 712, CD-ROM drives 714, and other hardware capable of reading and/or storing information such as DVD, etc. In one embodiment, software for carrying out the gaming operations in accordance with the present invention may be stored and distributed on a CD-ROM 716, diskette 718 or other form of media capable of portably storing information. These storage media may be inserted into, and read by, devices such as the CD-ROM drive 714, the disk drive 712, etc. The software may also be transmitted to the computing arrangement 700 via data signals, such as being downloaded electronically via a network, such as the Internet. Further, as previously described, the software for carrying out the functions associated with various embodiments may alternatively be stored in internal memory/storage of the computing device 700, such as in the ROM 706. The computing arrangement 700 is coupled to the display 720, which represents a display on which the gaming activities in accordance with the invention are presented. The display 720 merely represents the "presentation" of the video information in accordance with the invention, and may be any type of known display or presentation screen, such as LCD displays, plasma display, cathode ray tubes (CRT), etc. Where the computing device 700 represents a stand-alone or networked computer, the display 720 may represent a standard computer terminal or display capable of displaying multiple windows, frames, etc. Where the computing device is embedded within an electronic gaming machine, such as slot machine 600 of FIG. 6, the display 720 corresponds to the display screen 610 of FIG. 6. A user input interface 722 such as a mouse or keyboard may be provided where the computing device 700 is associated with a standard computer. An embodiment of a user input interface 722 is illustrated in connection with an electronic gaming machine 600 of FIG. 6 as the various "buttons" 608. Other user input interface devices include a keyboard, a mouse, a microphone, a touch pad, a touch screen, voice-recognition system, etc.

In various embodiments of the invention, various aspects of the game, as described herein, may be player controlled. For example, a player may place bets, select game types, select play area types, select grid types, select array types, select themes, select symbols, select elements, select colors, and/or select markings.

The computing arrangement 700 may be connected to other computing devices or gaming machines, such as via a network. The computing arrangement 700 may be connected to a network server 728 in an intranet or local network configuration. The computer may further be part of a larger network configuration as in a global area network (GAN)

such as the Internet. In such a case, the computer accesses one or more web servers 730 via the Internet 732.

Other components directed to slot machine implementations include manners of gaming participant payment, and gaming machine payout. For example, a slot machine including the computing arrangement 700 may also include a hopper controller 742 to determine the amount of payout to be provided to the participant. The hopper controller may be integrally implemented with the processor 702, or alternatively as a separate hopper controller 742. A hopper 744 may also be provided in slot machine embodiments, where the hopper serves as the mechanism holding the coins/tokens of the machine. The wager input module 746 represents any mechanism for accepting coins, tokens, coupons, bills, credit cards, smart cards, membership cards, etc. for which a participant inputs a wager amount.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

The present invention is applicable to various gaming activities that are played on a gaming board or gaming machine, including slot games such as reel slots and video slots, and other games utilizing corresponding grid elements to generate a game result. The present invention is described in terms of slot machines to provide an understanding of the invention. While the invention is particularly advantageous in the context of slot machines, and while a description in terms of slot machines facilitates an understanding of the invention, the invention is also applicable to other gaming activities of chance utilizing symbol strings as will be readily apparent to those of skill in the art from the description provided herein.

The circuitry represented in FIG. 7 can be used to perform the various methodologies and techniques discussed herein. For example, RAM 704 can be a computer readable medium encoded with a computer program, software, computer executable instructions, instructions capable of being executed by a computer, etc, to be executed by circuitry, such as processor 702, to cause the various other components, such as user input 722, display 720, hopper controller 742 and hopper 744, RNG 470, etc. to perform the various operations discussed herein.

One skilled in the art of computer science from the description provided herein will be able to combine the software created as described with appropriate general purpose or special purpose computer hardware to create a computer system and/or computer subcomponents embodying the invention, and to create a computer system and/or computer subcomponents for carrying out methods of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, the present invention is not limited to what is traditionally known as "slot machines." Also, while the illustrated embodiments have been described in large part in connection with a "slot machine," other gaming systems and concepts are also within the scope of the invention, such as video poker games, card games, lotteries, and other casino events implementing a video screen. For example, a video poker game may utilize the present invention to provide multiple cards at each standard card display segment. It is thus intended that the scope of the invention be limited not with this detailed description, but rather by the claims appended hereto.

The following is claimed:

1. A method of facilitating a plurality of rounds of a game, the method comprising:

providing a play area comprising a plurality of regions and game elements distributed within the regions, wherein each of the plurality of regions comprises a respective vertically orientated column of game elements spanning between a top and a bottom of the play area;

moving a roving wild indicator within the play area to one of the game elements, the roving wild indicator moving between the game elements within the play area during each of the plurality of rounds of the game, the element to which the roving wild indicator moves exhibiting wild functionality for at least a current round of the game;

selecting one of the plurality of regions as a wild region, each element within the wild region exhibiting wild functionality for at least the current round of the game;

marking a plurality of the game elements, each marking for each element of the plurality selected from a plurality of different marking types;

evaluating elements of the play area to identify if the game element to which the roving wild indicator is moved in the current round of the game is within the wild region;

evaluating elements of the play area to identify if one or more series of corresponding marked elements were formed, wherein the elements marked with common types of the different marking types correspond to one another and elements exhibiting wild functionality correspond to all game elements;

initiating at least one game play function other than wild functionality if the game element to which the roving wild indicator is moved is within the wild region based on the evaluation of the elements; and further comprising providing a plurality of column indicators located outside of the play area, each indicator of the plurality indicating a state of each region of the plurality, wherein selecting one of the plurality of regions as the wild region further comprises randomly selecting one of the column indicators and selecting the wild region based on which one of the plurality of column indicators is randomly selected.

2. The method of claim 1, wherein moving the roving wild indicator within the play area further comprises moving the roving wild indicator to a randomly selected game element adjacent to the game element at which the roving wild indicator was located in the previous round of game play.

3. The method of claim 1, wherein initiating at least one game play function other than wild functionality comprises initiating a plurality of free plays, each free play comprising re-marking the plurality of the game elements and evaluating the play area to identify if one or more series of corresponding marked elements were formed by each re-marking.

4. A method of facilitating a plurality of rounds of a game, the method comprising:

providing a play area comprising a plurality of regions and game elements distributed within the regions;

moving a roving wild indicator within the play area to one of the game elements, the roving wild indicator moving between the game elements within the play area during each of the plurality of rounds of the game, the element to which the roving wild indicator moves exhibiting wild functionality for at least a current round of the game;

selecting one of the plurality of regions as a wild region, each element within the wild region exhibiting wild functionality for at least the current round of the game;

marking a plurality of the game elements, each marking for each element of the plurality selected from a plurality of different marking types;

evaluating elements of the play area to identify if the game element to which the roving wild indicator is moved in the current round of the game is within the wild region;

evaluating elements of the play area to identify if one or more series of corresponding marked elements were formed, wherein the elements marked with common types of the different marking types correspond to one another and elements exhibiting wild functionality correspond to all game elements;

initiating at least one game play function other than wild functionality if the game element to which the roving wild indicator is moved is within the wild region based on the evaluation of the elements; and further comprising relocating the roving wild indicator to a game element adjacent the game element to which the roving wild indicator was moved in the current round if the game element to which the roving wild indicator was moved in the current round of the game is within the wild region based on the evaluation, wherein the wild indicator is relocated before the evaluation of the elements of the play area to identify if one or more series of corresponding marked elements were formed.

5. The method of claim 1, further comprising issuing a payout for each of the identified one or more series of corresponding marked elements.

6. The method of claim 1, wherein:

moving the roving wild indicator within the play area to one of the game elements further comprises moving the roving wild indicator within the play area to a randomly selected one of the game elements;

selecting the one of the plurality of regions as the wild region further comprises randomly selecting the one region from the plurality of regions; and marking the plurality of the game elements further comprises randomly selecting a respective marking for each of the plurality of game elements from the plurality of different marking types.

7. A computer-readable medium having instructions stored thereon which are executable by the processor for facilitating a game having a plurality of rounds by performing steps comprising:

displaying a play area on a display device, the play area comprising a plurality of regions and game elements distributed within the regions, wherein the plurality of regions comprises a respective vertically orientated column of game elements spanning between a top and a bottom of the play area;

moving a roving wild indicator within the play area to one of the game elements, the roving wild indicator moving between the game elements within the play area during each of the plurality of rounds of the game, the element to which the roving wild indicator moves exhibiting wild functionality for at least a current round of the game;

selecting one of the plurality of regions as a wild region, each element within the wild region exhibiting wild functionality for at least the current round of the game;

marking a plurality of the game elements, each marking for each element of the plurality selected from a plurality of different marking types;

evaluating elements of the play area to identify if the game element to which the roving wild indicator is moved in the current round of the game is within the wild region;

evaluating elements of the play area to identify if one or more series of corresponding marked elements were formed, wherein the elements marked with common types of the different marking types correspond to one another and elements exhibiting wild functionality correspond to all game elements;

initiating at least one game play function other than wild functionality if the game element to which the roving wild indicator is moved is within the wild region based on the evaluation of the elements; and wherein the computer-readable medium has further instructions stored thereon which are executable by the processor for facilitating the game by performing steps comprising providing a plurality of column indicators located outside of the play area, each indicator of the plurality indicating a state of each region of the plurality, wherein selecting one of the plurality of regions as the wild region further comprises randomly selecting one of the column indicators and selecting the wild region based on which one of the plurality of column indicators is randomly selected.

8. The gaming apparatus of claim 7, wherein the computer-readable medium has further instructions stored thereon which are executable by the processor for facilitating the game such that moving the roving wild indicator within the play area further comprises moving the roving wild indicator to a randomly selected game element adjacent to the game element at which the roving wild indicator was located in the previous round of game play.

9. The gaming apparatus of claim 7, wherein the computer-readable medium has further instructions stored thereon which are executable by the processor for facilitating the game such that initiating at least one game play function comprises initiating a plurality of free plays, each free play comprising re-marking the plurality of the game elements and evaluating the play area to identify if one or more series of corresponding marked elements were formed by each remarking.

10. A computer-readable medium having instructions stored thereon which are executable by the processor for facilitating a game having a plurality of rounds by performing steps comprising:

displaying a play area on a display device, the play area comprising a plurality of regions and game elements distributed within the regions;

moving a roving wild indicator within the play area to one of the game elements, the roving wild indicator moving between the game elements within the play area during each of the plurality of rounds of the game, the element to which the roving wild indicator moves exhibiting wild functionality for at least a current round of the game;

selecting one of the plurality of regions as a wild region, each element within the wild region exhibiting wild functionality for at least the current round of the game;

marking a plurality of the game elements, each marking for each element of the plurality selected from a plurality of different marking types;

evaluating elements of the play area to identify if the game element to which the roving wild indicator is moved in the current round of the game is within the wild region;

evaluating elements of the play area to identify if one or more series of corresponding marked elements were formed, wherein the elements marked with common types of the different marking types correspond to one another and elements exhibiting wild functionality correspond to all game elements;

initiating at least one game play function other than wild functionality if the game element to which the roving wild indicator is moved is within the wild region based on the evaluation of the elements; and wherein the computer-readable medium has further instructions stored thereon which are executable by the processor for facilitating the game by performing steps comprising relocating the roving wild indicator to a game element adjacent the game element to which the roving wild indicator was moved in the current round if the game element to which the roving wild indicator was moved in the current round of the game is within the wild region based on the evaluation, wherein the wild indicator is relocated before the evaluation of the elements of the play area to identify if one or more series of corresponding marked elements were formed.

11. The gaming apparatus of claim 7, wherein the computer-readable medium has further instructions stored thereon which are executable by the processor for facilitating the game by performing steps comprising issuing a payout for each of the identified one or more series of corresponding marked elements.

12. The gaming apparatus of claim 7, wherein the computer-readable medium has further instructions stored thereon which are executable by the processor for facilitating the game such that:

moving the roving wild indicator within the play area to one of the game elements further comprises moving the roving wild indicator within the play area to a randomly selected one of the game elements;

selecting the one of the plurality of regions as the wild region further comprises randomly selecting the one region from the plurality of regions; and marking the plurality of the game elements further comprises randomly selecting a respective marking for each of the plurality of game elements from the plurality of different marking types.

13. A gaming apparatus for facilitating a game having a plurality of rounds comprising:

a display device;

a processor configured to:

facilitate display of a play area on the display device, the play area comprising a plurality of regions and game elements distributed within the regions, wherein each of the plurality of regions of the play area comprise a respective vertically orientated column of game elements spanning between a top and a bottom of the play area;

control movement of a roving wild indicator within the play area to one of the game elements, the roving wild indicator moving between the game elements within the play area during each of the plurality of rounds of the game, the element to which the roving wild indicator moves exhibiting wild functionality for at least a current round of the game;

control selection of one of the plurality of regions as a wild region, each element within the wild region exhibiting wild functionality for at least the current round of the game;

control marking of a plurality of the game elements, each marking for each element of the plurality selected from a plurality of different marking types;

evaluate elements of the play area and determine if the game element to which the roving wild indicator is moved in the current round of the game is within the wild region;

evaluate elements of the play area and determine if one or more series of corresponding marked elements were formed, wherein the elements marked with common types of the different marking types correspond to one another and elements exhibiting wild functionality correspond to all game elements;

control initiation of at least one game play function other than wild functionality if the game element to which the roving wild indicator is moved is within the wild region based on the evaluation of the elements; and wherein the display device and the circuitry are configured provide a plurality of column indicators located outside of the play area, each indicator of the plurality indicating a state of each region of the plurality and selection of one of the plurality of regions as the wild region further comprises randomly selecting one of the column indicators and selecting the wild region based on which one of the plurality of column indicators is randomly selected.

14. The gaming apparatus of claim 13, wherein the circuitry is configured such that moving the roving wild indicator within the play area further comprises moving the roving wild indicator to a randomly selected game element adjacent to the game element at which the roving wild indicator was located in the previous round of game play.

15. The gaming apparatus of claim 13, wherein the circuitry is configured such that initiating at least one game play function comprises initiating a plurality of free plays, each free play comprising remarking the plurality of the game elements and evaluating the play area to identify if one or more series of corresponding marked elements were formed by each remarking.

16. The gaming apparatus of claim 13, wherein the circuitry is configured to relocate the roving wild indicator to a game element adjacent the game element to which the roving wild indicator was moved in the current round if the game element to which the roving wild indicator was moved in the current round of the game is within the wild region, wherein the wild indicator is relocated before the evaluation of the elements of the play area to identify if one or more series of corresponding marked elements were formed.

17. The gaming apparatus of claim 13, wherein the circuitry is configured to issue a payout for each of the identified one or more series of corresponding marked elements.

18. A gaming apparatus for facilitating a game having a plurality of rounds comprising:

means for presenting a play area comprising a plurality of regions and game elements distributed within the regions;

means for moving a roving wild indicator within the play area to one of the game elements, the roving wild indicator moving between the game elements within the play area during each of the plurality of rounds of the game, the element to which the roving wild indicator moves exhibiting wild functionality for at least a current round of the game;

means for selecting one of the plurality of regions as a wild region, each element within the wild region exhibiting wild functionality for at least the current round of the game;

means for marking a plurality of the game elements, each marking for each element of the plurality selected from a plurality of different marking types;

means for evaluating elements of the play area to identify if the game element to which the roving wild indicator is moved in the current round of the game is within the wild region;

means for evaluating elements of the play area to identify if one or more series of corresponding marked elements were formed, wherein the elements marked with common types of the different marking types correspond to one another and elements exhibiting wild functionality correspond to all game elements;

means for initiating at least one bonus game play function if the game element to which the roving wild indicator is moved is within the wild region based on the evaluation of the elements; and further comprising providing a plurality of column indicators located outside of the play area, each indicator of the plurality indicating a state of each region of the plurality, wherein selecting one of the plurality of regions as the wild region further comprises randomly selecting one of the column indicators and selecting the wild region based on which one of the plurality of column indicators is randomly selected, wherein each of the plurality of regions comprise a respective vertically orientated column of game elements spanning between a top and a bottom of the play area.

19. A gaming apparatus for facilitating a game having a plurality of rounds comprising:

means for presenting a play area comprising a plurality of regions and game elements distributed within the regions;

means for moving a roving wild indicator within the play area to one of the game elements, the roving wild indicator moving between the game elements within the play area during each of the plurality of rounds of the game, the element to which the roving wild indicator moves exhibiting wild functionality for at least a current round of the game;

means for selecting one of the plurality of regions as a wild region, each element within the wild region exhibiting wild functionality for at least the current round of the game;

means for marking a plurality of the game elements, each marking for each element of the plurality selected from a plurality of different marking types;

means for evaluating elements of the play area to identify if the game element to which the roving wild indicator is moved in the current round of the game is within the wild region;

means for evaluating elements of the play area to identify if one or more series of corresponding marked elements were formed, wherein the elements marked with common types of the different marking types correspond to one another and elements exhibiting wild functionality correspond to all game elements;

means for initiating at least one bonus game play function if the game element to which the roving wild indicator is moved is within the wild region based on the evaluation of the elements; and further comprising means for relocating the roving wild indicator to a game element adjacent the game element to which the roving wild indicator was moved in the current round if the game element to which the roving wild indicator was moved in the current round of the game is within the wild region based on the evaluation, wherein the wild indicator is relocated before the evaluation of the elements of the play area to identify if one or more series of corresponding marked elements were formed.

* * * * *